April 29, 1958 W. H. BATCHLER 2,832,627
GATE LATCH KEEPER
Original Filed Sept. 13, 1954 3 Sheets-Sheet 2
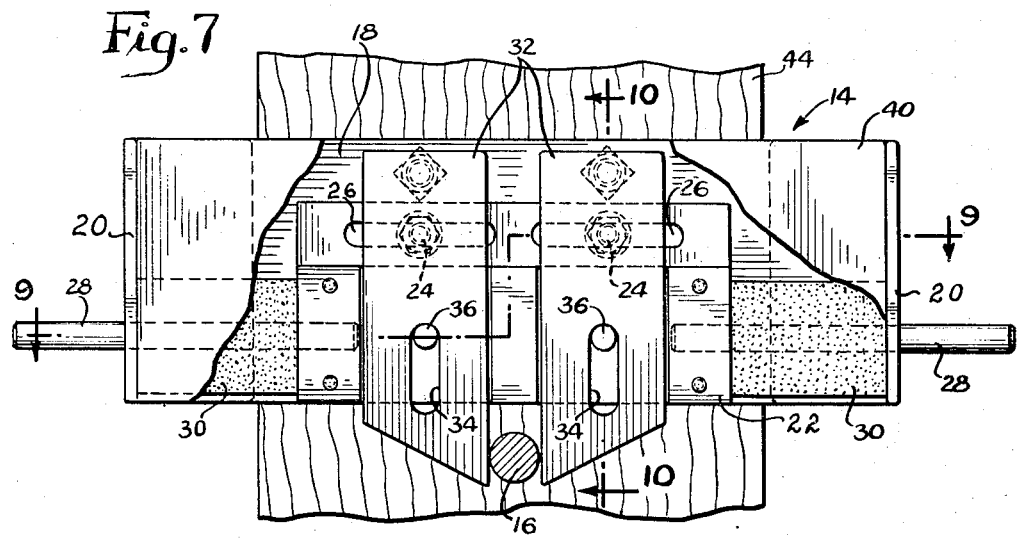
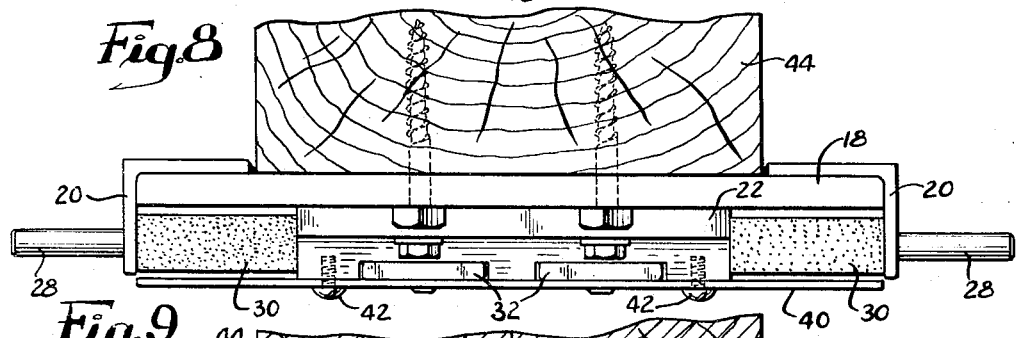
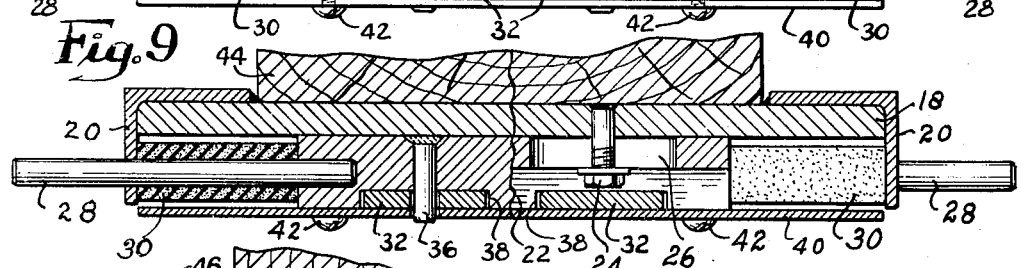
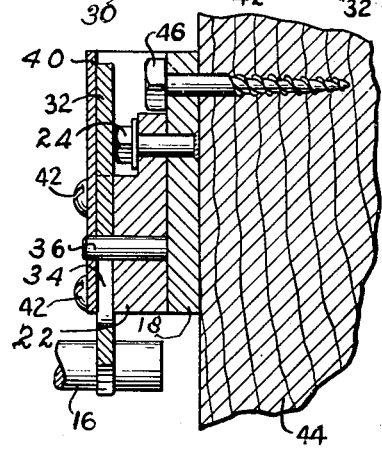
Inventor
William H. Batchler
by: *Wayland D. Keith*
His Agent April 29, 1958
W. H. BATCHLER
2,832,627
GATE LATCH KEEPER
Original Filed Sept. 13, 1954
3 Sheets-Sheet 3
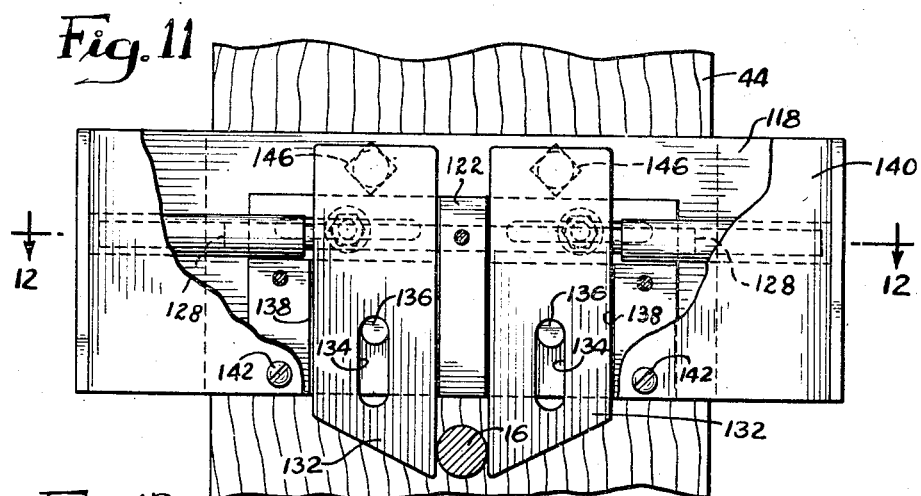
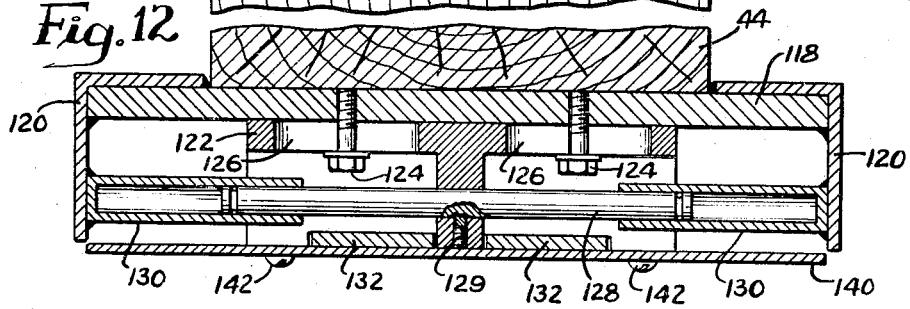
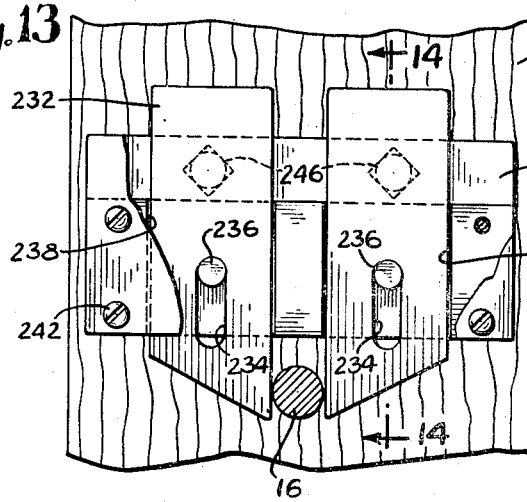
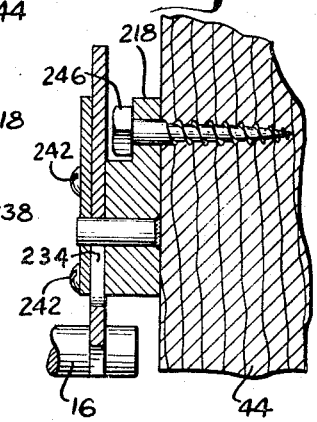
Inventor
William H. Batchler
by: Wayland D. Keith
His Agent

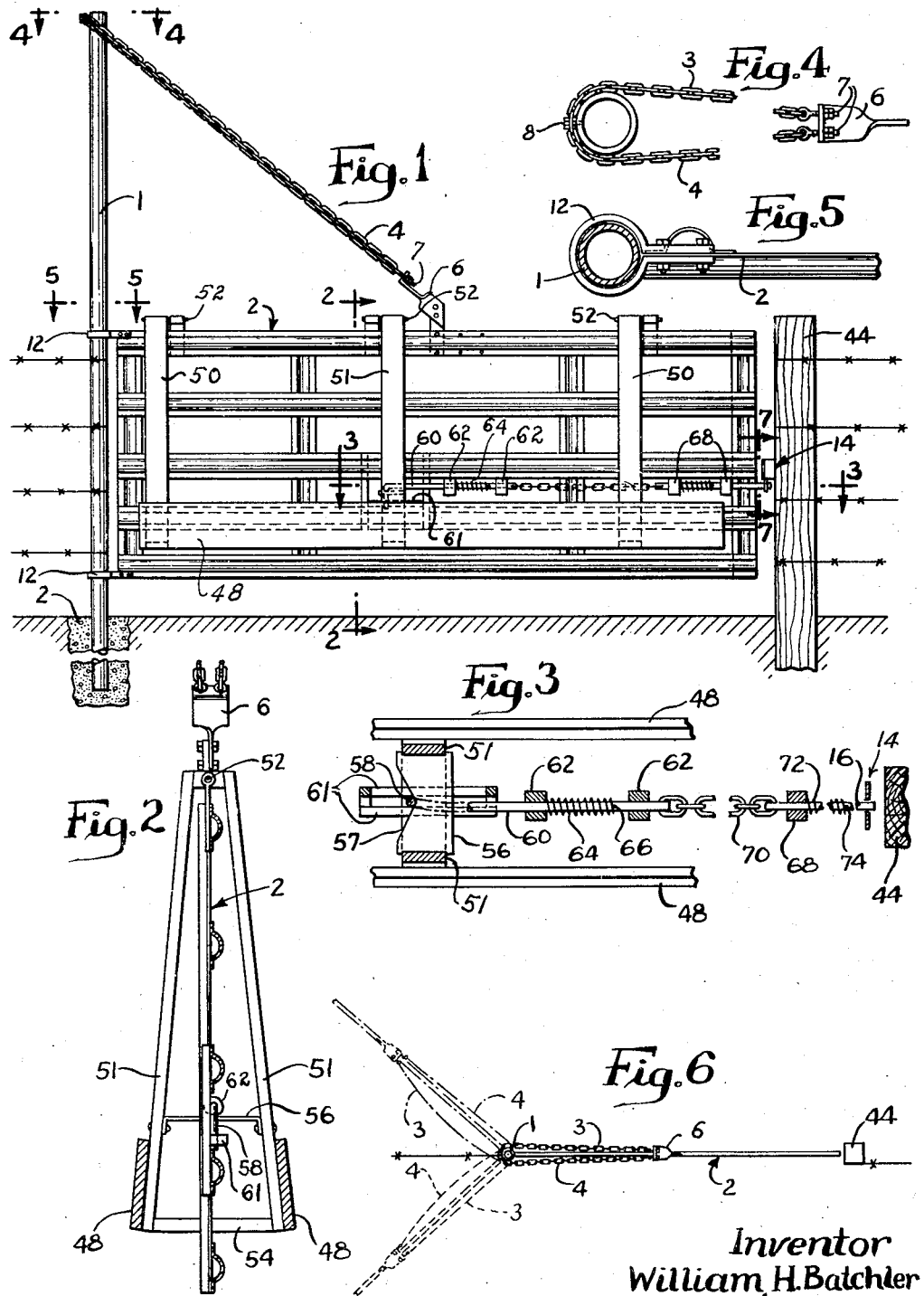

United States Patent Office 2,832,627
Patented Apr. 29, 1958

2,832,627

GATE LATCH KEEPER

William H. Batchler, Mineral Wells, Tex.

Original application September 13, 1954, Serial No. 455,604. Divided and this application March 7, 1956, Serial No. 570,167

5 Claims. (Cl. 292—341.15)

This invention relates to improvements in gate mechanisms and more particularly to the keeper for the latch mechanism for opening, closing and latching a gate by the use of a vehicle actuated latch mechanism, which latch mechanism is actuated by the application of pressure thereto by the bumper of the vehicle.

Various gates have been proposed heretofore, to be opened by pressure from a vehicle, but for the most part, latch mechanism for such gates lacked the flexibiliy of operation necessary for unlatching, opening, closing and latching the gate by means of pressure applied thereto by a part of the vehicle.

In the present device a gate is presented, the latch mechanism of which may be readily unlatched by action of the bumper of a vehicle from either side of the gate, which gate is self closing, and self latching, with no necessity for the operator to leave the vehicle.

An object of this invention is to provide a vehicle operated gate latch which may be opened from either side of the gate, and which will readily close and latch, once the vehicle has passed therethrough.

Another object of the invention is to provide a gate latch which is mounted on a gate, which gate is supported to swing into closed position and to latch after it has been opened.

Still another object of this invention is to provide a vehicle bumper operated gate latch mechanism, which mechanism has cushioning means therein to prevent abrupt jar or shock upon closing the gate.

A still further object of this invention is to provide a gate latch mechanism which will operate from either side of the gate, and which will give a positive stop and latching of the gate at a predetermined central point of the swing thereof.

Yet another object of the invention is to provide a gate latch which may be opened by contact from a vehicle at any point in the length of the gate.

A yet further object of the invention is to provide a gate latching mechanism which is simple in construction, easy to install, easy to operate and which is positive in action.

With these objects in mind and others which will manifest themselves as the description proceeds, reference is to be had to the accompanying drawings in which like reference characters designate like parts in the several views thereof, in which:

Fig. 1 is an elevational view of a gate embodying the invention;

Fig. 2 is a vertical cross sectional view taken on the line 2—2 of Fig. 1, looking in the direction indicated by the arrows;

Fig. 3 is a fragmentary detail sectional view taken on the line 3—3 of Fig. 1, looking in the direction indicated by the arrows, with parts broken away and shortened to bring out the details of construction;

Fig. 4 is a fragmentary sectional view taken on the line 4—4 of Fig. 1, looking in the direction indicated by the arrows;

Fig. 5 is a fragmentary sectional view taken on the line 5—5 of Fig. 1, looking in the direction indicated by the arrows;

Fig. 6 is a diagrammatic plan view showing the closed position of the gate in full outline, and the open position thereof in dot-dash outline;

Fig. 7 is an enlarged sectional view taken on the line 7—7 of Fig. 1, looking in the direction indicated by the arrows, and with parts broken away, showing one form of the invention;

Fig. 8 is a top plan view of the form of the invention as shown in Fig. 7;

Fig. 9 is a sectional view taken on the line 9—9 of Fig. 7, looking in the direction indicated by the arrows;

Fig. 10 is a sectional view taken on the line 10—10 of Fig. 7, looking in the direction indicated by the arrows;

Fig. 11 is a sectional view similar to Fig. 7, but of a second form of the latch mechanism;

Fig. 12 is a sectional view taken on the line 12—12 of Fig. 11, looking in the direction indicated by the arrows;

Fig. 13 is a sectional view similar to Fig. 7, but of the third form of the latch mechanism; and Fig. 14 is a sectional view taken on the line 14—14 of Fig. 13, looking in the direction indicated by the arrows.

With more detailed reference to the drawing, the numeral 1 designates an upstanding, round post, which is usually set in concrete, as indicated in Fig. 2, so as to maintain the post in a perpendicular position. The present post is shown to be tubular in construction and to extend a substantial distance above the top of the gate, which gate is designated generally by the numeral 2. A pair of chains 3 and 4, as will best be seen in Figs. 1 and 4, are attached to the top of post 1 and to a bracket 6 by eye bolts 7, which bracket 6 is mounted on top of gate 2. This bracket 6 is provided with holes therein to enable the longitudinal movement thereof along the top of gate 2, so as to support the weight thereof in such manner as to close the gate at the desired speed. By adjusting the nuts on the respective eye bolts 7, minute adjustment in the length of the respective chains 3 and 4 may be had, so as to cause the gate to swing exactly to a center point. The chains 3 and 4 pass around the post 1 and each of the chains is anchored to the post, as indicated at 8. The chains 3 and 4 will cause the gate to swing to a central position to be latched, as one chain wraps about the post and slides the gate hinges 12 upward along the post until the gate is opened to a degree greater than ninety degrees.

The time lag between the completely open position of the gate and the point at which it starts to close is determined by the diameter of the round post 1, as the smaller the diameter of the post, the more slowly the gate will close. The post provided in the present instance is of such diameter as to allow the vehicle to pass through the gate-way and clear the radial swing of the gate, before the closing mechanism begins to operate. The hinges 12 are adapted to fit loosely around the post to permit free sliding action, and as the chains wind around the post 1, the gate is so balanced, by the adjustment of the bracket 4 therealong, as to lift the gate from a central weight point. As the gate is moved into one of the other positions, as indicated in dot-dash outline in Fig. 6, the unwinding of one of the chains will permit the gate to swing toward the central point to engage the latch keeper mechanism, which is generally designated by the numeral 14.

The latch keeper mechanism is adapted to cooperate with a slide bolt 16 which is slidably mounted in brackets 4 on the gate 2, as will be more fully described hereinafter.

The latch keeper mechanism, as shown in Figs. 7 through 10, has a base plate 18 to which out-turned angle members 20 are secured, one angle member being secured at each end of said base plate. The base plate 18 has an intermediate body portion 22 which is slidably mounted on bolts 24, which bolts are mounted within slots 26 within the body 22, so as to enable longitudinal sliding movement of the body within certain limits.

A guide bar 28 is mounted in each end of the sliding body 22 and extends out through respective sponge rubber members 30 and out through a hole in the respective angle members 20. Each of the sponge rubber members abuts, at the outer end thereof, with the respective angle member, and with the sliding member 22 at the respective inner ends, so upon movement of body 22, the movement is cushioned so as to prevent jarring action when the slide bolt 16 engages the inner flat face of the sliding keeper member 32 with a sudden impact.

The sliding keeper members are slidably mounted for vertical sliding movement on central sliding body member 22 and each of the keeper members 32 has vertical slots 34 therein and in which slots pins 36 are fitted. The pins 36 are secured to the central sliding body portion 22. The sliding keeper members 32 are fitted within recesses 38 which are formed within central sliding body member 22, so that the keeper members 32 are free to slide vertically, but will move with the body 22 within the compressibility of sponge rubber members 30.

A cover plate 40 is secured to the central sliding body member by means of screws 42 so as to maintain the keeper members 32 in place.

The base plate 18 is secured to post 44 by means of bolts or screws 46, which maintains the latch member 14 in rigid relation with respect to the post 44.

The lower end of each latch member 32 is beveled upward and outward, as will best be seen in Fig. 7, so upon movement of the slide bolt 16 against the latch keeper member 32, the latch keeper member 32, having pressure applied thereto against the angular lower end thereof, will move upward until the slide bolt 16 passes between the latch keeper members 32, whereupon, the slide bolt 16 will abut with the vertical face of the opposite latch member. Then the lower end of the latch keeper member having been contacted, that keeper member 32 will drop behind the slide bolt 16, whereupon, the slide bolt will be prevented from moving in either direction with respect to the latch keeper member 32. However, the latch keeper member 32, together with the slidable central body portion 22, will move, by inertia against the sponge rubber members 30, which will arrest the movement of the gate. After the movement of the gate has been arrested, the sponge rubber member 30, together with the weight of the gate returning to the central point under the influence of chains 3 and 4 winding around post 1, will bring the gate to rest substantially at the central point of its swing, until such time as it will again be opened.

When it is desired to open the gate, the bumper of the car or the like, is pushed against the bumper board 48, which bumper board 48 is mounted on framework 50 which is hingeably supported on a pivot member 52. The pivot member 52 is mounted on the top of gate 2, so that the horizontal axis thereof is parallel with the top member of the gate. It is preferable to have the bumper board 48 extend throughout the greater part of the length of the gate so that the gate can be opened by means of pressure applied to the bumper board 48 at any point in the length thereof. The bumper board framework 50 has a brace 54 extending between the frame members so as to maintain the members 50 in spaced relation. A cross member 56 extends between the brace members 51, as will best be seen in Figs. 1, 2, and 3, which cross member has a V-notch 57 therein, as will best be seen in Fig. 3. A downturned end 58 of a slide bolt extension 60 fits within this V-notch 57 so as to impart sliding movement to the slide bolt extension rod 60, when either of the bumper boards 48 is moved toward the gate 2. The downturned end 58 of slide bolt extension rod 60 is fitted within a slot formed between bars 61, which are rigidly attached to the slatted members of gate 2. In this manner an even guided action is imparted to the downturned end 58, upon movement of V-notch cam 57. Upon the slide bolt extension rod 60 being moved within lugs 62 against tension of spring 64, which is anchored with respect to the rod by means of a pin 66, the slide bolt 16, which is slidably mounted in lugs 62, will be withdrawn by chain 70 which is attached to the inner end of slide bolt 16 and the outer end of extension slide bolt 60.

The slide bolt 16 has a spring 72 telescoped thereover, which spring has the outer end thereof anchored by a pin 74, so as to urge the slide bolt 16 outward, so as to be in the path of latch keeper member 32 upon the closing of the gate, when the sline bolt 16 is in protruded position.

*Operation of the device utilizing the first described form of gate latch mechanism*

When the gate is at rest, and with the latch mechanism as shown in Figs. 1, 2, 7 and 10, the gate is ready to be opened by the pressure of a vehicle bumper, or other suitable pressure, being applied to the bumper board 48 on one side of the gate. The bumper board is moved toward the gate, whereupon the framework 50—51, which is constructed substantially in the form of an A, is moved sufficiently to allow V-notch 57 within cross memer 56 to move downturned end 58 of slide bolt extension rod 60 toward post 1, which will withdraw latch extension 60, chain 70, and slide bolt 16 against tension of springs 64 and 72. When the end of slide bolt 16 has cleared the latch keeper 32, the gate will swing into position as indicated in dot-dash outline in Fig. 6, whereupon the vehicle may be driven through the gate-way. Upon the opening of the gate, one of the chains 3 or 4 will be wound around post 1, which will slide the gate hinges 12 upward along the post. Then, when the outward movement of the gate is arrested, the tighter chain will begin to unwind, which will move the gate toward a central position, as shown in full outline in Fig. 6. Upon the engagement of the slide bolt 16 with the lower beveled face of the end of the keeper member 32, the latch keeper member contacted will be moved upward in guided relation by slot 34, within the limits defined by pin 36, until the slide bolt 16 abuts with the adjacent perpendicular face of latch bar 32, whereupon, the latch bar 32, which has been raised, will drop into the lowermost position, as defined by slot 34, so as to maintain the slide bolt therebetween.

The inertia created by the closing of the gate will tend to move the center body 22 longitudinally in guided relation by bars 28 sliding within holes in one of the angle members 20. However, the sponge rubber member 30, positioned between the outer end of each member 22, and the inner face of each member 20, will cushion the impact so as to relieve the movement of jarring action or shock, so that it will take place with a minimum of noise, whereupon, the gate will be arrested at the central point ready for opening by the bumper of the vehicle.

*Second form of invention*

The second form of invention, as illustrated in Figs. 11 through 12, operates in much the same manner as the form described above and illustrated in Figs. 7 through 10. However, the form of the invention utilizes an air cushioning means to retard the movement of the mechanism, instead of the sponge rubber members as described for the first form of the device.

The numeral 118 designates a base plate which is adapted to be mounted on a post 44 in a manner similar to the mounting of the latch 14. Out-turned angle members 120 are secured, one at each end, to base plate 118, as by welding or the like. A longitudinally slidable body 122 is mounted on base plate 118 by means of cap screws or bolts 124, which bolts pass through horizontally elongated slots 126 formed in the body member 122, and which slots limit the longitudinal movement of longitudinally slidable body member 122. A longitudinally slidable plunger rod 128 is fitted within cylinder 130 in close fitting relation, so as to form an air cushioning chamber at each end of the plunger rod 128. The plunger rod 128 is anchored to longitudinally slidable body 122 by means of a set screw 129, so upon movement of the longitudinally slidable body 122 in either direction, air will be compressed in one or the other of the cylinders 130.

A pair of latch bars 132 are mounted within grooves 138 which are formed in sliding body 122 and each latch bar 132 has a slot 134 therein through which a pin 136 passes and into longitudinally movable body member 122.

A cover plate 140 is secured to longitudinally movable body 122 by means of screw 142 so as to maintain latch bars 132 in vertical sliding relation, yet maintain them against longitudinal displacement upon the closing of the gate 2. The lower end of each of the respective latch bars slope upwardly and outwardly so as to form an angular face with which to engage slide bolt 16, which will cause the lifting of the particular bar 132, but when the bolt 16 has passed between the keeper or latch bars, the bars will drop by gravity to maintain the slide bolt 16 therebetween. However, the inertia of the gate will cause plunger 128 to move longitudinally within the cylinders 130 so as to compress air therein to arrest movement thereof. When the movement has been arrested, the air, together with the weight of the gate unwinding chain 3 or 4, will cause the gate to swing to a central position with respect to the post 44.

It is to be pointed out that the latch, as shown in Figs. 11 and 12, may be readily mounted on post 44 by means of bolts or lag screws 146 in a manner well understood in the art.

The operation of this form of the invention is the same as that described in the first form and shown in Figs. 7 through 10, and is used with a gate in the same manner as described above.

Third form of invention

The form of the invention, as shown in Figs. 13 and 14, is similar to the above mentioned forms of the invention, except no provision is made for the longitudinal movement of the central body portion.

The numeral 218 designates a base plate in which it is preferable to have vertical grooves 238 formed, which grooves are spaced apart and adapted to receive vertically sliding keeper members 232, which are similar in construction to the keepers described above, and designated as 32 and 132.

Slots 234 are formed in the respective keeper members 232, through which pins 236 pass. The respective pins are anchored within the base plate 218. The keeper members 232 are beveled so as to slop upwardly and outwardly from their respective inner faces, so upon movement of slide bolt 16 against the end of one of the keepers 232 from the outer side thereof, the bar will be raised within the limits of the slots 234.

A cover plate 240 is fitted over keeper members 232 and is secured to base plate 218 by means of screws 242. The base plate 218 is secured to post 44 by means of bolts or lag screws 246.

This form of invention operates in substantially the same manner as the previously described forms, that is, by the outer sloping face of one of the keeper members 232 engaging slide bolt 16, whereupon, the slide bolt will move between the keeper members with one of said keeper members dropping by gravity, so as to maintain the slide bar 16 therebetween, however, when the slide bar abuts with the inner vertical face of the keeper member 232, the gate is brought to a positive stop.

The forms of the latch inventions, as shown in Figs. 11 and 12, 13 and 14, will operate equally as well in conjunction with the form of the gate as shown in Figs. 1 through 6.

It is to be pointed out that either of the forms of the latch will give a positive latching action, and to open the gate, the slide bolt 16 needs to be drawn longitudinally until it clears the respective keeper bar.

While the invention has been illustrated and described in some detail and with variations thereof, it is to be understood that changes may be made in the minor details of construction without departing from the spirit of the invention or the scope of the appended claims.

Having thus clearly shown and described the invention, what is claimed as new and desired to secure by Letters Patent is:

1. In a gate latch keeper, a base plate adapted to be rigidly secured to a gate post, a body portion mounted on said base plate for limited, horizontal, guided, sliding movement with respect thereto, a pair of keeper members mounted on said body portion and spaced apart horizontally for independent, limited vertical, sliding movement with respect to said body portion, each of said keeper members having an outer face thereof sloping upwardly and outwardly from the lowermost inner end thereof, and means to retain said keeper members in relative sliding relation with respect to said body portion.

2. The device as defined in claim 1, wherein pin and slot means interconnect said base plate and said body portion to provide the limited, horizontal sliding movement of said body portion relative to said base plate.

3. The device as defined in claim 1, wherein pin and slot means interconnect said body portion with each of said vertically slidable keeper members for limited vertical sliding movement of the respective keeper members with respect to said body portion.

4. The device as defined in claim 2, wherein pin and slot means interconnect each of said keeper members with said body portion to provide the respective keeper members with limited, vertical sliding movement of the respective keeper members with respect to said body portion.

5. In a gate latch keeper, a base plate adapted to be rigidly secured to a gate post, a body portion mounted on said base plate, a horizontal bar attached to said body portion and being slidably mounted with respect to said base portion for horizontal, sliding movement with respect thereto, at least one outstanding pin means mounted on said base portion and extending horizontally outward substantially at a right angle to said bar member, said body having at least one slot formed therein substantially in longitudinally aligned relation with respect to said horizontal bar, said outstanding pin means fitted within said slot in sliding relation so as to limit the longitudinal movement of said body portion in each direction with respect to said base plate, vertical recesses formed in said body portion, an outstanding pin mounted in each of said recesses on said body, which pins extend horizontally outward substantially at a right angle to said horizontally disposed bar, a pair of keeper members each having a longitudinal slot formed therein, one of said keeper members fitted within each of said recesses so said longitudinal slots formed therein will receive said horizontal, outwardly extending pins, which pins are mounted on said body portion to limit the longitudinal movement of each of said keepers with respect to said body portion, each of said keepers having an outer face thereof sloping upwardly and outwardly from the lowermost end thereof, and means to retain said keeper members in relative sliding relation with respect to said body portion.

References Cited in the file of this patent

UNITED STATES PATENTS

| | | |
|---|---|---|
| 409,797 | Moore | Aug. 27, 1889 |
| 1,177,487 | Clements | Mar. 28, 1916 |
| 2,076,092 | Pinard | Apr. 6, 1937 |